United States Patent
Schneider et al.

(10) Patent No.: US 12,231,586 B2
(45) Date of Patent: Feb. 18, 2025

(54) UE CHALLENGE TO A NETWORK BEFORE AUTHENTICATION PROCEDURE

(71) Applicant: Nokia Technologies Oy, Espoo (FI)

(72) Inventors: Peter Schneider, Holzkirchen (DE); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 239 days.

(21) Appl. No.: 17/947,969

(22) Filed: Sep. 19, 2022

(65) Prior Publication Data

US 2023/0108626 A1  Apr. 6, 2023

Related U.S. Application Data

(60) Provisional application No. 63/252,686, filed on Oct. 6, 2021.

(51) Int. Cl.
*H04L 9/32* (2006.01)
*H04L 9/08* (2006.01)
*H04W 12/037* (2021.01)

(52) U.S. Cl.
CPC .......... *H04L 9/3271* (2013.01); *H04L 9/0869* (2013.01); *H04L 9/3213* (2013.01); *H04L 9/3242* (2013.01); *H04W 12/037* (2021.01)

(58) Field of Classification Search
None
See application file for complete search history.

(56) References Cited

U.S. PATENT DOCUMENTS

| | | | |
|---|---|---|---|
| 7,715,822 B2 * | 5/2010 | Semple | H04L 63/0853 455/433 |
| 10,270,770 B1 * | 4/2019 | Irwan | H04L 63/0876 |
| 2016/0286600 A1 * | 9/2016 | Faccin | H04W 76/27 |

FOREIGN PATENT DOCUMENTS

WO   WO-2006046289 A1 *   5/2006   ........... G06K 7/0008

OTHER PUBLICATIONS

3GPP TR 33.846 v0.13.0 (Aug. 2021) Technical Specification Group Services and System Aspects; Study on authentication enhancements in 5G System; (Release 17).

(Continued)

*Primary Examiner* — Benjamin E Lanier
(74) *Attorney, Agent, or Firm* — Duft & Bornsen, PC

(57) ABSTRACT

Systems, methods, and software of performing a UE challenge. In one embodiment, User Equipment (UE) initiates a UE challenge procedure to a home network before engaging in a primary authentication procedure by generating a UE challenge by encrypting a random nonce with a home network public key, and transmitting a first message containing the UE challenge toward the home network. The UE receives a second message containing a challenge response to the UE challenge, processes the challenge response to determine whether the home network decrypted the random nonce in response to the UE challenge, and verifies an identity of the home network when the home network decrypted the random nonce in response to the UE challenge.

20 Claims, 14 Drawing Sheets

(56) References Cited

OTHER PUBLICATIONS

2GPP TS 23.501 v17.1.1 (Jun. 2021) Technical Specification Group Services and System Aspects; System architecture for the 5G System (5GS) Stage 2 (Release 17).
3GPP TS 33.102 v16.0.0 (Jul. 2020) Technical Specification Group Services and System Aspects: 3G Security; Security architecture (Release 16).
3GPP TS 33.501 v17.2.1 (Jun. 2021) Technical Specification Group Services and System Aspects; Security architecture and procedures for 5G system (Release 17).

* cited by examiner

UE CHALLENGE TO A NETWORK BEFORE AUTHENTICATION PROCEDURE

RELATED APPLICATIONS

This non-provisional patent application claims priority to U.S. Provisional Patent Application No. 63/252,686 filed on Oct. 6, 2021, which is incorporated by reference as if fully provided herein.

TECHNICAL FIELD

Various example embodiments relate to the field of communication systems and, in particular, to next generation networks.

BACKGROUND

Next generation networks, such as Fifth Generation (5G), denote the next major phase of mobile telecommunications standards beyond Fourth Generation (4G) standards. In comparison to 4G networks, next generation networks may be enhanced in terms of radio access and network architecture. Next generation networks intend to utilize new regions of the radio spectrum for Radio Access Networks (RANs), such as centimeter and millimeter wave bands.

The 3rd Generation Partnership Project (3GPP) has set forth security mechanisms for 5G mobile networks, and the security procedures performed within the 5G mobile networks. One of the security procedures between User Equipment (UE) and a 5G mobile network is primary authentication and key agreement. Primary authentication and key agreement procedures enable mutual authentication between the UE and the network, and provide keying material that can be used between the UE and the serving network in subsequent security procedures. The keying material generated by the primary authentication and key agreement procedure results in a long-term key stored in the UE and in the network. When the UE has no existing security context and temporary identity, and wants to connect to the network, the UE provides its identity to the network (i.e., a Subscription Concealed Identifier (SUCI) containing the Subscription Permanent Identifier (SUPI) protected based on the home network public key that is provisioned in the USIM). The network decrypts the UE identity (SUPI), looks up the subscription data and the long-term key, and generates a random challenge (RAND) and authentication token (AUTN) that is sent to the UE. The UE verifies the authentication token, uses the long-term key to compute a response (RES) to the challenge, and sends the response to the network proving possession of the shared long-term key. If the primary authentication procedure is successful, a security association is established using another message exchange (security mode command and response).

Present security mechanisms may still be vulnerable to malicious attacks. Thus, it remains a problem to identify more robust security mechanisms.

SUMMARY

Described herein is a solution that introduces a UE challenge procedure before primary authentication initiates. As an overview, the UE sends a UE challenge to the network before engaging in a primary authentication procedure. The network answers the challenge by a computation proving the network's possession of the home network private key corresponding with the home network public key provisioned on the UE. By verifying this computation, the UE gets proof that it is connected to the genuine home network. One technical benefit is the UE is less vulnerable to attacks, such as linkability attacks.

In an embodiment, a user equipment comprises at least one processor and at least one memory storing instructions that, when executed by the at least one processor, cause the user equipment at least to initiate a user equipment challenge procedure to a home network before engaging in a primary authentication procedure by generating a user equipment challenge by encrypting a random nonce with a home network public key, and transmitting a first message containing the user equipment challenge toward the home network. The at least one processor further causes the user equipment to receive a second message containing a challenge response to the user equipment challenge, process the challenge response to determine whether the home network decrypted the random nonce in response to the user equipment challenge, and verify an identity of the home network when the home network decrypted the random nonce in response to the user equipment challenge.

In an embodiment, the at least one processor causes the user equipment at least to compute a subscription concealed identifier for the user equipment that includes the random nonce as encrypted and a subscription permanent identifier as encrypted, and transmit the first message containing the subscription concealed identifier toward the home network.

In an embodiment, the second message received by the user equipment contains an authentication token that includes a first message authentication code generated by the home network. The at least one processor causes the user equipment at least to calculate a second message authentication code based on the random nonce, compare the first message authentication code and the second message authentication code, and determine that the home network decrypted the random nonce in response to the user equipment challenge when the first message authentication code and the second message authentication code match.

In an embodiment, the second message received by the user equipment contains a random challenge, and the at least one processor causes the at least to calculate the second message authentication code by inputting an exclusive-OR of the random challenge and the random nonce into a function that calculates the second message authentication code.

In an embodiment, the first message comprises a registration request.

In an embodiment, the at least one processor causes the user equipment at least to transmit the registration request in a radio resource control setup complete message.

In an embodiment, the challenge response received in the second message comprises the random nonce as decrypted.

In an embodiment, a method performed by a user equipment to challenge a home network is disclosed. The method comprises initiating a user equipment challenge procedure to the home network before engaging in a primary authentication procedure by generating a user equipment challenge by encrypting a random nonce with a home network public key, and transmitting a first message containing the user equipment challenge toward the home network. The method further comprises receiving a second message containing a challenge response to the user equipment challenge, processing the challenge response to determine whether the home network decrypted the random nonce in response to the user equipment challenge, and verifying an identity of the home network when the home network decrypted the random nonce in response to the user equipment challenge.

In an embodiment, generating the user equipment challenge comprises computing a subscription concealed identifier for the user equipment that includes the random nonce as encrypted and a subscription permanent identifier as encrypted, and transmitting the first message comprises transmitting the first message containing the subscription concealed identifier toward the home network.

In an embodiment, the second message received by the user equipment contains an authentication token that includes a first message authentication code generated by the home network. Processing the challenge response comprises calculating a second message authentication code based on the random nonce, comparing the first message authentication code and the second message authentication code, and determining that the home network decrypted the random nonce in response to the user equipment challenge when the first message authentication code and the second message authentication code match.

In an embodiment, the second message received by the user equipment contains a random challenge, and calculating the second message authentication code comprises inputting an exclusive-OR of the random challenge and the random nonce into a function that calculates the second message authentication code.

In an embodiment, the first message comprises a registration request.

In an embodiment, transmitting the first message comprises transmitting the registration request in a radio resource control setup complete message.

In an embodiment, the challenge response received in the second message comprises the random nonce as decrypted.

In an embodiment, a network element of a home network for a user equipment is disclosed. The network element comprises at least one processor and at least one memory storing instructions that, when executed by the at least one processor, cause the network element at least to receive a first message containing a user equipment challenge initiated by the user equipment prior to a primary authentication procedure, where the user equipment challenge comprises a random nonce encrypted by the user equipment with a home network public key. The at least one processor causes the network element at least to decrypt the random nonce with a home network private key, generate a challenge response using the random nonce, and transmit a second message that contains the challenge response toward the user equipment.

In an embodiment, the at least one processor causes the network element at least to receive the first message containing a subscription concealed identifier for the user equipment, and decrypt the random nonce and a subscription permanent identifier from the subscription concealed identifier using the home network private key.

In an embodiment, the at least one processor causes the network element at least to calculate a message authentication code of an authentication token based on the random nonce, and transmit the second message containing the authentication token toward the user equipment.

In an embodiment, the at least one processor causes the network element at least to select a random number, calculate the message authentication code by inputting an exclusive-OR of the random number and the random nonce into a function that calculates the message authentication code, and transmit the second message containing the authentication token and the random number toward the user equipment.

In an embodiment, the first message comprises a registration request.

In an embodiment, the registration request is carried in a radio resource control setup complete message.

In an embodiment, the challenge response transmitted in the second message comprises the random nonce as decrypted.

In an embodiment, a method of performing a user equipment challenge procedure by a network element is disclosed. The method comprises receiving, at the network element, a first message containing a user equipment challenge initiated by the user equipment prior to a primary authentication procedure, where the user equipment challenge comprises a random nonce encrypted by the user equipment with a home network public key. The method further comprises decrypting the random nonce with a home network private key, generating a challenge response using the random nonce, and transmitting a second message that contains the challenge response toward the user equipment.

In an embodiment, receiving the first message comprises receive the first message containing a subscription concealed identifier for the user equipment, and decrypting the random nonce comprises decrypting the random nonce and a subscription permanent identifier from the subscription concealed identifier using the home network private key.

In an embodiment, generating the challenge response comprises calculating a message authentication code of an authentication token based on the random nonce, and transmitting the second message comprises transmitting the second message containing the authentication token toward the user equipment.

In an embodiment, calculating the message authentication code comprises selecting a random number, calculating the message authentication code by inputting an exclusive-OR of the random number and the random nonce into a function that calculates the message authentication code. Transmitting the second message comprises transmitting the second message containing the authentication token and the random number toward the user equipment.

In an embodiment, the first message comprises a registration request.

In an embodiment, the registration request is carried in a radio resource control setup complete message.

In an embodiment, the challenge response transmitted in the second message comprises the random nonce as decrypted.

In an embodiment, a user equipment comprises a means for initiating a user equipment challenge procedure to a home network before engaging in a primary authentication procedure by generating a user equipment challenge by encrypting a random nonce with a home network public key, and transmitting a first message containing the user equipment challenge toward the home network. The user equipment further comprises a means for receiving a second message containing a challenge response to the user equipment challenge, a means for processing the challenge response to determine whether the home network decrypted the random nonce in response to the user equipment challenge, and a means for verifying an identity of the home network when the home network decrypted the random nonce in response to the user equipment challenge.

In an embodiment, the user equipment further comprises a means for computing a subscription concealed identifier for the user equipment that includes the random nonce as encrypted and a subscription permanent identifier as encrypted, and a means for transmitting the first message containing the subscription concealed identifier toward the home network.

In an embodiment, the second message received by the user equipment contains an authentication token that includes a first message authentication code generated by the home network. The user equipment further comprises a means for calculating a second message authentication code based on the random nonce, a means for comparing the first message authentication code and the second message authentication code, and a means for determining that the home network decrypted the random nonce in response to the user equipment challenge when the first message authentication code and the second message authentication code match.

In an embodiment, the second message received by the user equipment contains a random challenge, and the user equipment further comprises a means for calculating the second message authentication code by inputting an exclusive-OR of the random challenge and the random nonce into a function that calculates the second message authentication code.

In an embodiment, the first message comprises a registration request.

In an embodiment, the user equipment further comprises a means for transmitting the registration request in a radio resource control setup complete message.

In an embodiment, the challenge response received in the second message comprises the random nonce as decrypted.

In an embodiment, a network element of a home network for a user equipment is disclosed. The network element comprises a means for receiving a first message containing a user equipment challenge initiated by the user equipment prior to a primary authentication procedure, where the user equipment challenge comprises a random nonce encrypted by the user equipment with a home network public key. The network element further comprises a means for decrypting the random nonce with a home network private key, a means for generating a challenge response using the random nonce, and a means for transmitting a second message that contains the challenge response toward the user equipment.

In an embodiment, the network element further comprises a means for receiving the first message containing a subscription concealed identifier for the user equipment, and a means for decrypting the random nonce and a subscription permanent identifier from the subscription concealed identifier using the home network private key.

In an embodiment, the network element further comprises a means for calculating a message authentication code of an authentication token based on the random nonce, and a means for transmitting the second message containing the authentication token toward the user equipment.

In an embodiment, the network element further comprises a means for selecting a random number, a means for calculating the message authentication code by inputting an exclusive-OR of the random number and the random nonce into a function that calculates the message authentication code, and a means for transmitting the second message containing the authentication token and the random number toward the user equipment.

In an embodiment, the first message comprises a registration request.

In an embodiment, the registration request is carried in a radio resource control setup complete message.

In an embodiment, the challenge response transmitted in the second message comprises the random nonce as decrypted.

Other embodiments may include computer readable media, other systems, or other methods as described below. Also, one or more of the embodiments described above may be combined.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
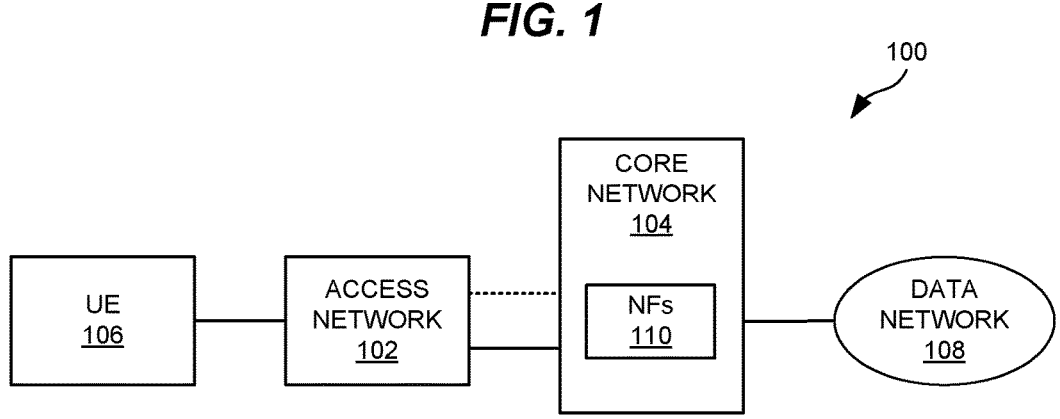
FIG. 1 illustrates a high-level architecture of a 5G system.

FIG. 1 illustrates a high-level architecture of a 5G system 100. A 5G system 100 is a communication system (e.g., a 3GPP system) comprising a 5G Access Network ((R)AN) 102, a 5G Core Network (CN) 104, and 5G User Equipment (UE) 106. Access network 102 may comprise an NG-RAN and/or a non-3GPP access network connecting to a 5G core network 104. Access network 102 may support Evolved-UMTS Terrestrial Radio Access Network (E-UTRAN) access (e.g., through an eNodeB, gNodeB, and/or ng-eNodeB), Wireless Local Area Network (WLAN) access, fixed access, satellite radio access, new Radio Access Technologies (RAT), etc. Core network 104 interconnects access network 102 with a data network (DN) 108. Core network 104 is comprised of Network Functions (NF) 110, which may be implemented either as a network element on dedicated hardware, as a software instance running on dedicated hardware, as a virtualized function instantiated on an appropriate platform (e.g., a cloud infrastructure), etc. Data network 108 may be an operator external public or private data network, or an intra-operator data network (e.g., for IMS services). UE 106 is a 5G capable device configured to register with core network 104 to access services. UE 106 may be an end user device, such as a mobile phone (e.g., smartphone), a tablet or PDA, a computer with a mobile broadband adapter, etc. UE 106 may be enabled for voice services, data services, Machine-to-Machine (M2M) or Machine Type Communications (MTC) services, and/or other services.

Figure 2:
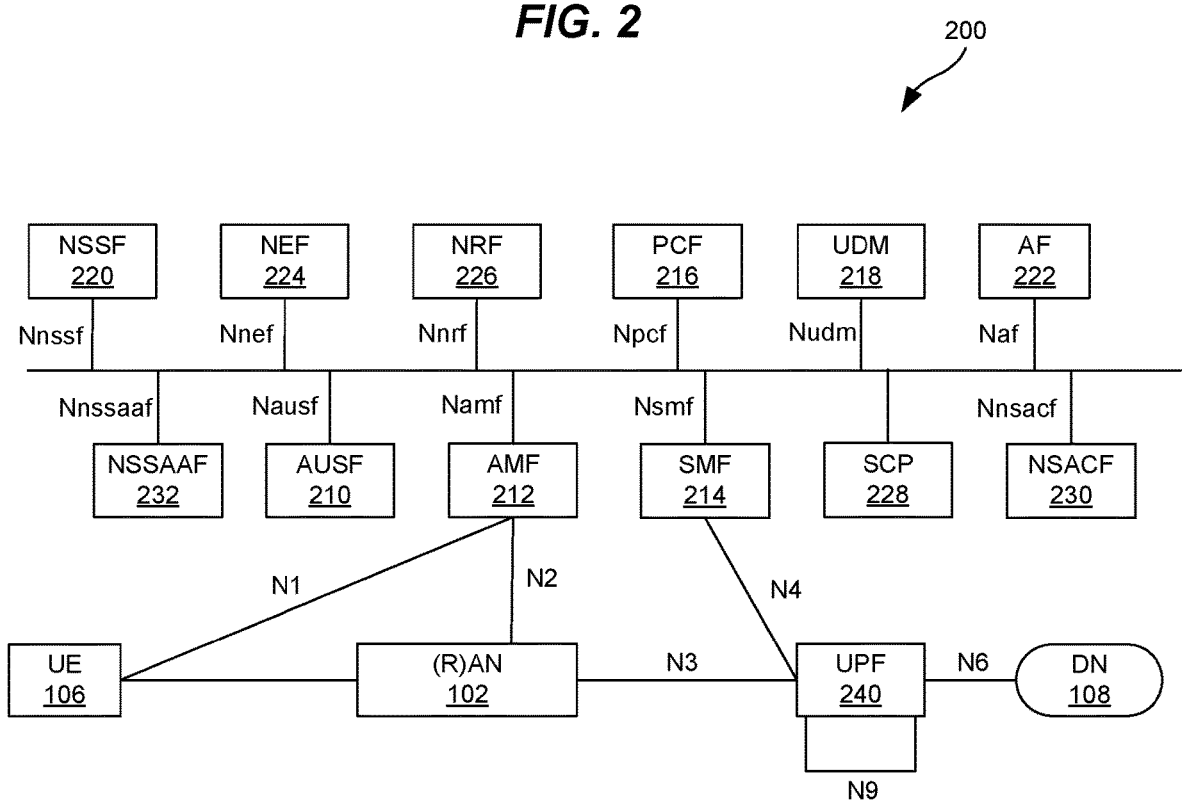
FIG. 2 illustrates a non-roaming architecture of a 5G system.

FIG. 2 illustrates a non-roaming architecture 200 of a 5G system. The architecture 200 in FIG. 2 is a service-based representation, as is further described in 3GPP TS 23.501 (v17.1.1), which is incorporated by reference as if fully included herein. Architecture 200 is comprised of Network Functions (NF) for a core network 104, and the NFs for the control plane (CP) are separated from the user plane (UP). The control plane of the core network 104 includes an Authentication Server Function (AUSF) 210, an Access and Mobility Management Function (AMF) 212, a Session Management Function (SMF) 214, a Policy Control Function (PCF) 216, a Unified Data Management (UDM) 218, a Network Slice Selection Function (NSSF) 220, and an Application Function (AF) 222. The control plane of the core network 104 further includes a Network Exposure Function (NEF) 224, a NF Repository Function (NRF) 226, a Service Communication Proxy (SCP) 228, a Network Slice Admission Control Function (NSACF) 230, and a Network Slice-specific and SNPN Authentication and Authorization Function (NSSAAF) 232. The user plane of the core network 104 includes one or more User Plane Functions (UPF) 240 that communicate with data network 108. UE 106 is able to access the control plane and the user plane of the core network 104 through (R)AN 102.

There is a large number of subscribers that are able to access services from a carrier that implements a mobile network comprising a 5G system 100, such as in FIGS. 1-2. Communications between the subscribers (i.e., through a UE) and the mobile network are protected by security mechanisms, such as the ones standardized by the 3GPP. Subscribers and the carrier expect security guarantees from the security mechanisms. One of the security mechanisms is the primary authentication procedure that provides mutual authentication between the UE and the network. The following further illustrates primary authentication.

Figure 3:
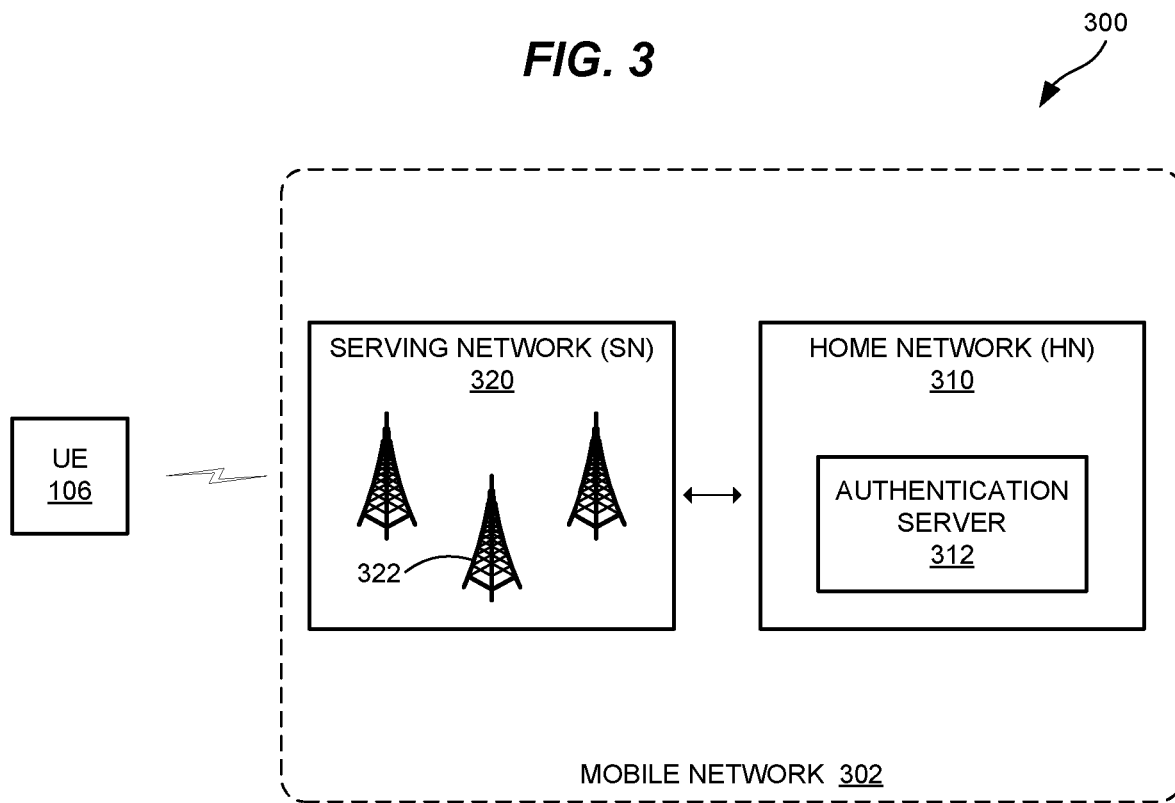
FIG. 3 is a block diagram of a mobile network architecture in an illustrative embodiment.

FIG. 3 is a block diagram of a mobile network architecture 300 in an illustrative embodiment. Mobile network architecture 300 includes a mobile network 302 configured to establish communications with UEs (represented by UE 106). Mobile network 302 (also referred to as a cellular network) is a type of network where the last link is wireless, and provides voice and/or data services to a plurality of devices. Mobile network 302 includes the home network (HN) 310 for UE 106 that implements a variety of network elements or network functions. Home network 310 represents an operator network or carrier network through which a subscriber has a subscription for services. Among the network functions of home network 310, an authentication server 312 is shown that supports authentication of UE 106.

UE 106 may be located where home network 310 does not have a base station (i.e., gNodeB or eNodeB), such as when roaming. Thus, mobile network 302 is also shown as including a serving network (SN) 320. Serving network 320 includes one or more base stations 322 that are able to communicate with UE 106 via radio signals. UE 106 and serving network 320 communicate over the air, while serving network 320 and home network 310 communicate over an authenticated channel.

Figure 4:
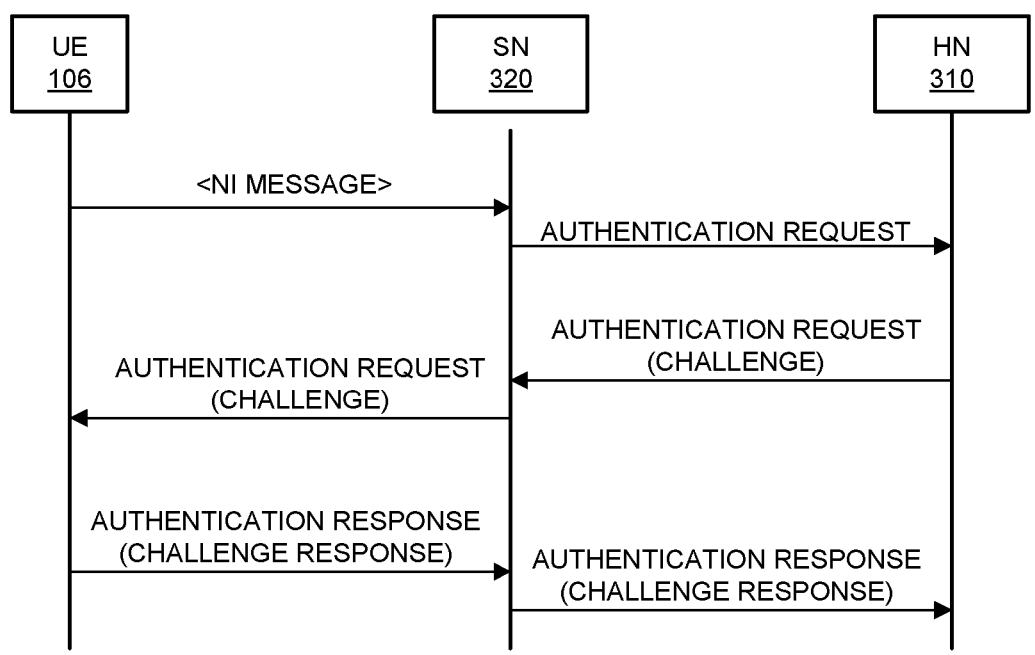
FIG. 4 is a signaling diagram illustrating a primary authentication procedure.

FIG. 4 is a signaling diagram illustrating a primary authentication procedure. The example shown in FIG. 4 is a high-level overview of the primary authentication procedure. It is assumed that UE 106 is capable of connecting to home network 310, and is connected to a base station 322 of serving network 320, which in turn is connected to home network 310. It may also be assumed that no security context exists between UE 106 and home network 310. To connect with home network 310, UE 106 transmits an N1 message (i.e., an initial Non-Access Stratum (NAS) message) to serving network 320, such as a registration request. In response to the N1 message, serving network 320 may initiate primary authentication of UE 106. For primary authentication, serving network 320 sends an authentication request to home network 310, which is routed to authentication server 312 of home network 310. Upon receipt of the authentication request, authentication server 312 selects an authentication method, such as 5G Authentication and Key Agreement (AKA) or Extensible Authentication Protocol (EAP)-AKA as suggested by the 3GPP.

The selected authentication method is a challenge-response procedure. Thus, authentication server 312 computes an authentication challenge for UE 106, and transmits an authentication request to serving network 320 with the authentication challenge for UE 106. Serving network 320 forwards the authentication request to UE 106. In response to the authentication request, UE 106 computes a challenge response and transmits an authentication response to serving network 320 that contains the challenge response. Serving network 320 then forwards the challenge response to home network 310. If home network 310 is able to validate the challenge response from UE 106, then UE 106 is authenticated to home network 310 and a security context may be established. Communications between UE 106 and home network 310 may then be protected based on the security context.

Although the present authentication procedures may be effective, they may also be vulnerable to linkage or linkability attacks. The root cause is that when no security context exists, UE 106 needs to engage in unprotected communication and provide its identity (UE ID) before it gets proof that it is communicating with a genuine network. Attackers may setup a fake base station (FBS) or a "relay-FBS" that is able to relay messages between UE 106 and the genuine network. This way, the attackers may perform linkage attacks by means of replaying previously-captured UE IDs to the network or replaying previously captured authentication challenges to UE 106.

In the embodiments described herein, UE 106 initiates a UE challenge procedure before engaging in a primary authentication procedure. For the UE challenge procedure, UE 106 sends a challenge to a network before primary authentication for UE 106 begins. The network responds to the challenge of UE 106 by a computation proving the network's possession of a home network private key corresponding with the home network public key provisioned in UE 106 (i.e., on the USIM). By verifying this computation, UE 106 gets proof that it is connected to the genuine home network.

Figure 5:
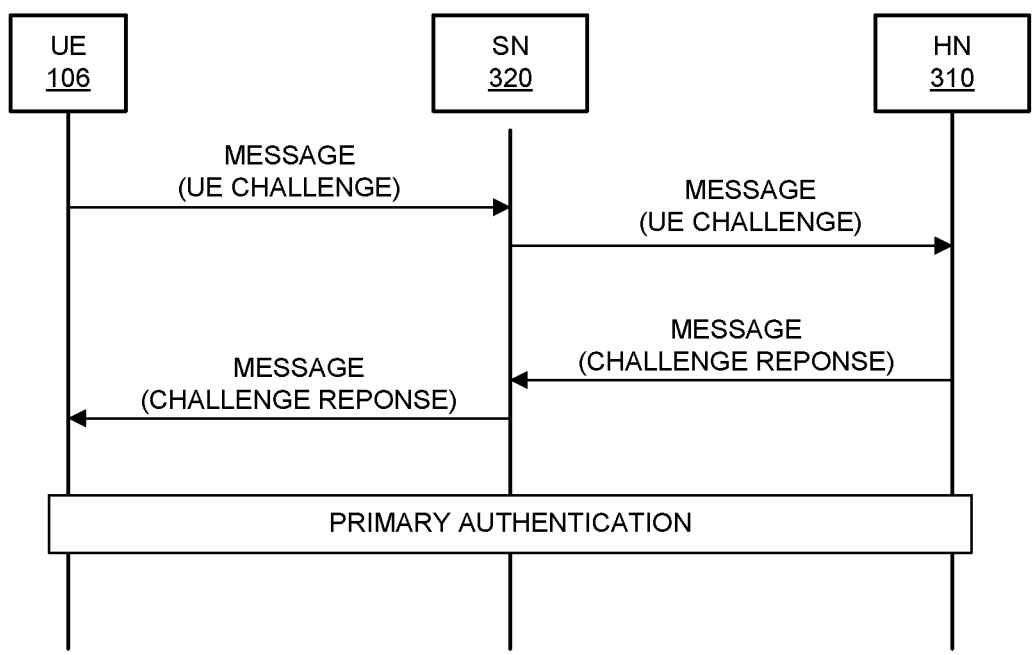
FIG. 5 is a signaling diagram illustrating a UE challenge procedure before initiation of a primary authentication procedure in an illustrative embodiment.

FIG. 5 is a signaling diagram illustrating a UE challenge procedure before initiation of a primary authentication procedure in an illustrative embodiment. UE 106 generates a UE challenge using a home network public key, and transmits a message containing the UE challenge to serving network 320. Serving network 320 then forwards the UE challenge to home network 310. Home network 310, such as through authentication server 312, generates a challenge response using the home network private key that corresponds with the home network public key, and transmits a message to serving network 320 containing the challenge response. Serving network 320 forwards the challenge response to UE 106. If UE 106 is able to validate the challenge response generated by home network 310, then UE 106 is able to verify the identity of home network 310. In other words, UE 106 is able to determine from the challenge response that home network 310 has possession of the home network private key, and that home network 310 is the genuine home network of UE 106. With home network 310 verified, UE 106 may engage in primary authentication with home network 310. Further details of the UE challenge procedure are provided below.

Figure 6:
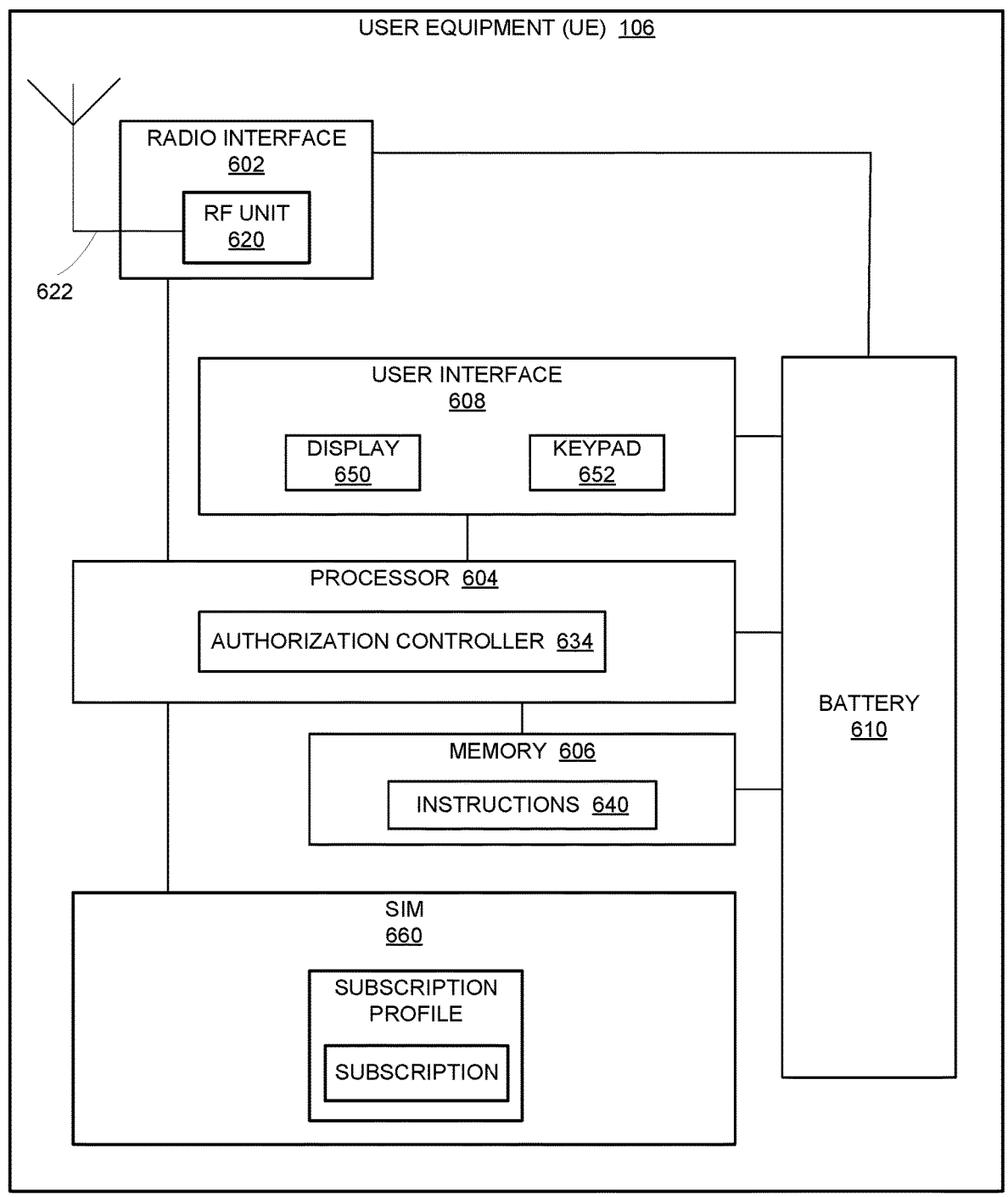
FIG. 6 is a block diagram of User Equipment (UE) in an illustrative embodiment.

FIG. 6 is a block diagram of a UE 106 in an illustrative embodiment. UE 106 includes a radio interface component 602, one or more processors 604, a memory 606, a user interface component 608, and a battery 610. Radio interface component 602 is a hardware component that represents the local radio resources of UE 106, such as an RF unit 620 (e.g., one or more radio transceivers) and one or more antennas 622. Radio interface component 602 may be configured for WiFi, Bluetooth, 5G New Radio (NR), Long-Term Evolution (LTE), etc. Processor 604 represents the internal circuitry, logic, hardware, etc., that provides the functions of UE 106. Processor 604 may be configured to execute instructions 640 (i.e., computer program code) for software that are loaded into memory 606. Processor 604 may comprise a set of one or more processors or may comprise a multi-processor core, depending on the particular implementation. Memory 606 is a computer readable storage medium for data, instructions 640, applications, etc., and is accessible by processor 604. Memory 606 is a hardware storage device capable of storing information on a temporary basis and/or a permanent basis. Memory 606 may comprise a random-access memory, or any other volatile or non-volatile storage device. Processor 604, memory 606, and any algorithms (encoded as instructions, programs, or code) may comprise means for providing or causing performance or operation of UE 106.

User interface component 608 is a hardware component for interacting with an end user. For example, user interface component 608 may include a display 650, screen, touch screen, or the like (e.g., a Liquid Crystal Display (LCD), a Light Emitting Diode (LED) display, etc.). User interface component 608 may include a keyboard or keypad 652, a tracking device (e.g., a trackball or trackpad), a speaker, a microphone, etc. UE 106 may include various other components not specifically illustrated in FIG. 6.

UE 106 also includes a Subscriber Identity Module (SIM) 660, which is an integrated circuit that provides security and integrity functions for UE 106 (e.g., SIM card, Universal SIM (USIM), etc.). SIM 660 includes or is provisioned with one or more subscription profiles for UE 106. A subscription profile has an associated subscription, subscription parameters, subscription credentials, etc. Subscription credentials are a set of values that includes a public key of its home network, a long-term secret key (K), and a subscription identifier (e.g., SUPI) used to uniquely identify a subscription and to mutually authenticate the UE 106 and a network.

Processor 604 may implement an authentication controller 634 in this embodiment. Authentication controller 634 is configured to support a UE challenge procedure, a primary authentication procedure from the UE side, and/or other functions, as is described in more detail below.

Figure 7:
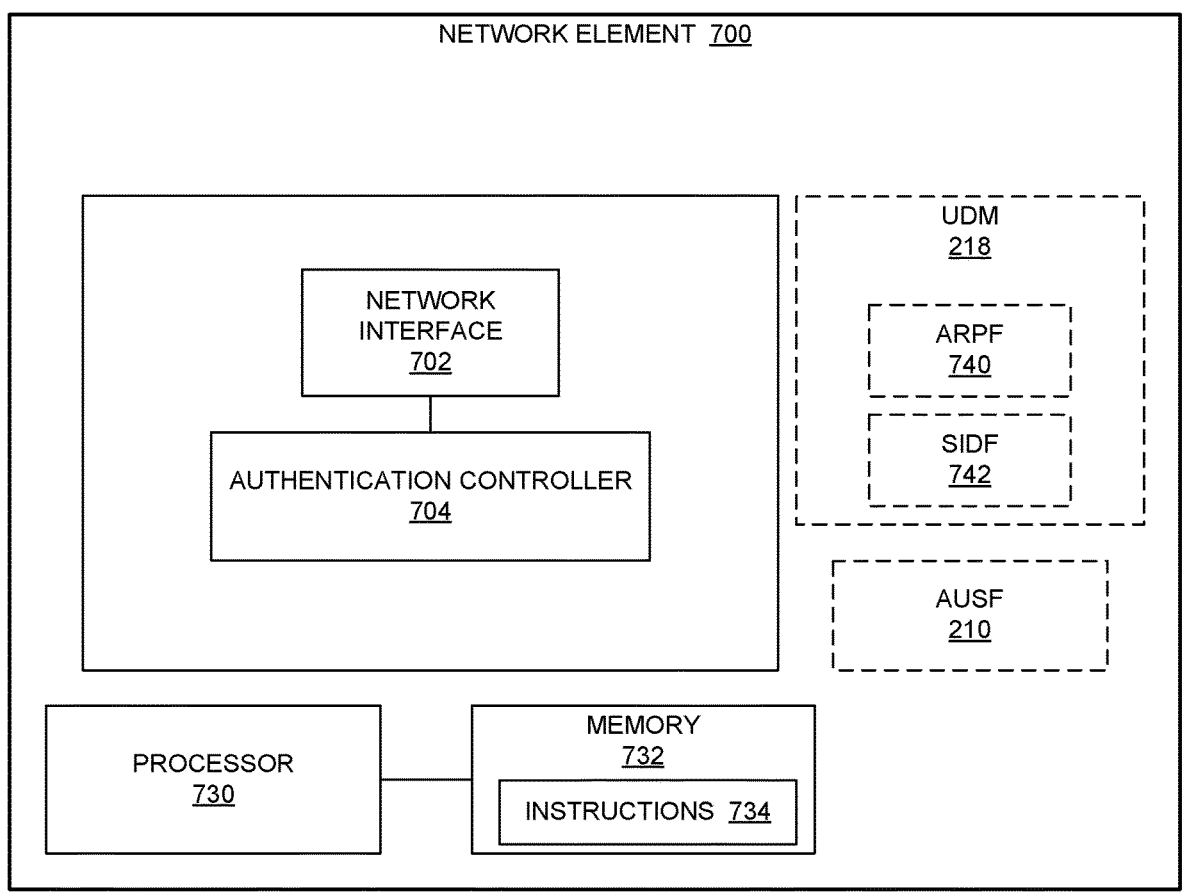
FIG. 7 is a block diagram of a network element in an illustrative embodiment.

FIG. 7 is a block diagram of a network element 700 in an illustrative embodiment. Network element 700 comprises a server, device, apparatus, equipment (including hardware), system, etc., that implements one or more network functions (NF) 110 of a 5G core network 104. Network element 700 may therefore represent an authentication server 312 of a home network 310 for a UE 106. In this embodiment, network element 700 includes the following subsystems: a network interface component 702, and an authentication controller 704 that operate on one or more platforms. Network interface component 702 may comprise circuitry, logic, hardware, means, etc., configured to exchange control plane messages or signaling with other network elements and/or UEs (e.g., through serving network 320). Network interface component 702 may operate using a variety of protocols (including NAS protocol) or reference points. Authentication controller 704 may comprise circuitry, logic, hardware, means, etc., configured to handle authentication and/or security procedures, such as to create a NAS security context, select a NAS security algorithm(s) for a NAS security context, etc.

As illustrated in FIG. 7, network element 700 may represent a UDM 218 of a 5G core network 104. In this embodiment, UDM 218 may include an Authentication credential Repository and Processing Function (ARPF) 740 and a Subscription Identifier De-concealing Function (SIDF) 742. ARPF 740 is a functional entity configured to select an authentication method based on a subscriber identity (e.g., SUPI), and generate authentication vectors (AV) for authenticating UEs. SIDF 742 is a functional entity configured to decrypt a SUCI to obtain the SUPI of a UE. In 5G, a subscriber long-term identity (SUPI) is concealed in a SUCI when transmitted over the radio interface. SIDF 742 therefore is configured to resolve the SUPI from the SUCI based on the protection scheme used to generate the SUCI. Network element 700 may additionally or alternatively represent an AUSF 210 of a 5G core network 104. An AUSF 210 is also configured to perform authentication of a UE. AUSF and UDM functionalities may be under a common network function.

One or more of the subsystems of network element 700 may be implemented on a hardware platform comprised of analog and/or digital circuitry. One or more of the subsystems of network element 700 may be implemented on one or more processors 730 that execute instructions 734 (i.e., computer readable code) for software that are loaded into memory 732. A processor 730 comprises an integrated hardware circuit configured to execute instructions 734 to provide the functions of network element 700. Processor 730 may comprise a set of one or more processors or may comprise a multi-processor core, depending on the particular implementation. Memory 732 is a non-transitory computer readable storage medium for data, instructions, applications, etc., and is accessible by processor 730. Memory 732 is a hardware storage device capable of storing information on a temporary basis and/or a permanent basis. Memory 732 may comprise a random-access memory, or any other volatile or non-volatile storage device. The term "non-transitory", as used herein, is a limitation of the medium itself (i.e., tangible, not a signal) as opposed to a limitation on data storage persistency (e.g., RAM vs. ROM). Processor 730, memory 732, and any algorithms (encoded as instructions, programs, or code) may comprise means for providing or causing performance or operation of network element 700.

Network element 700 may include various other components not specifically illustrated in FIG. 7.

Figure 8:
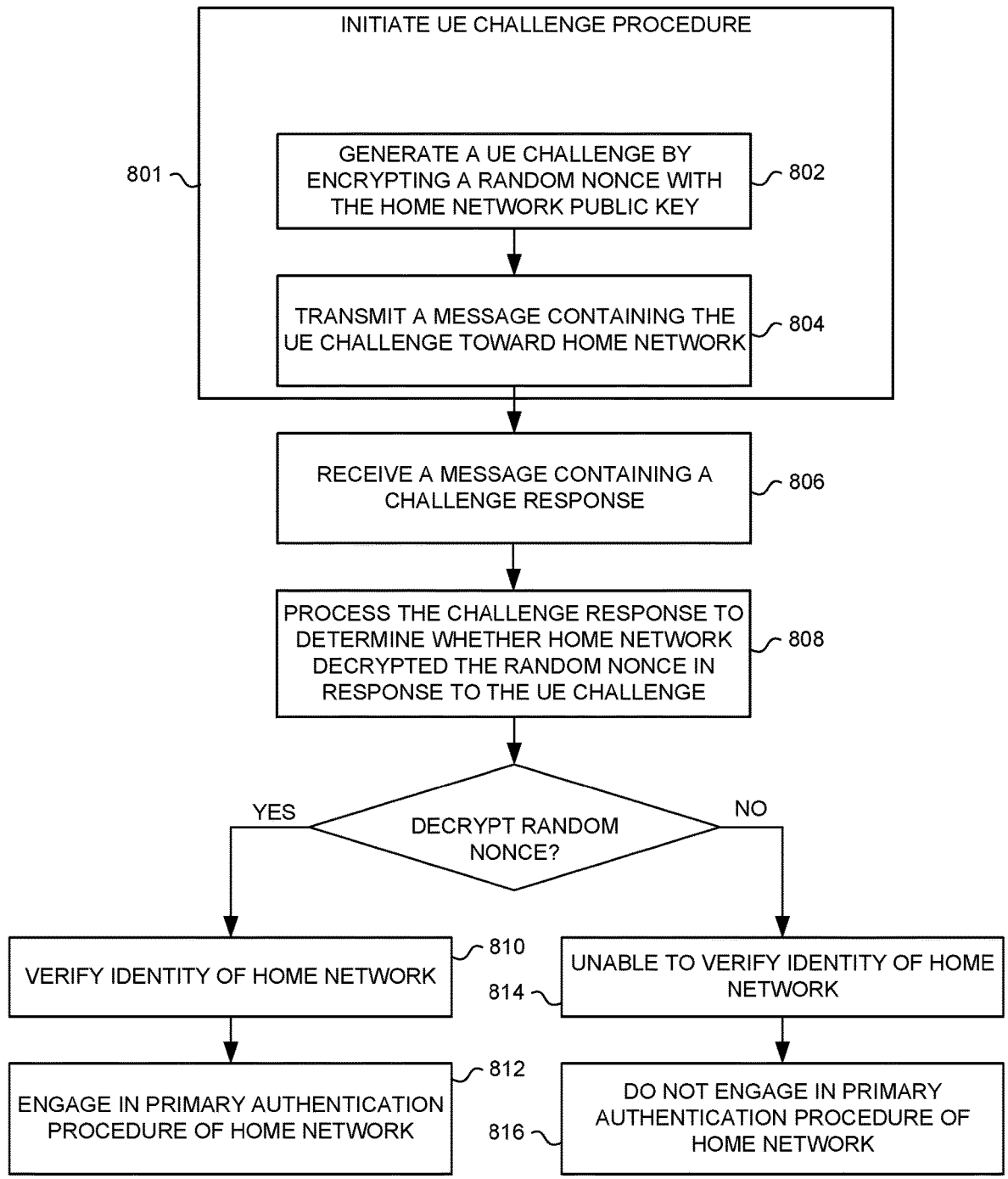
FIGS. 8-9 are flow charts illustrating a method of performing a UE challenge procedure in an illustrative embodiment.
Figure 9:
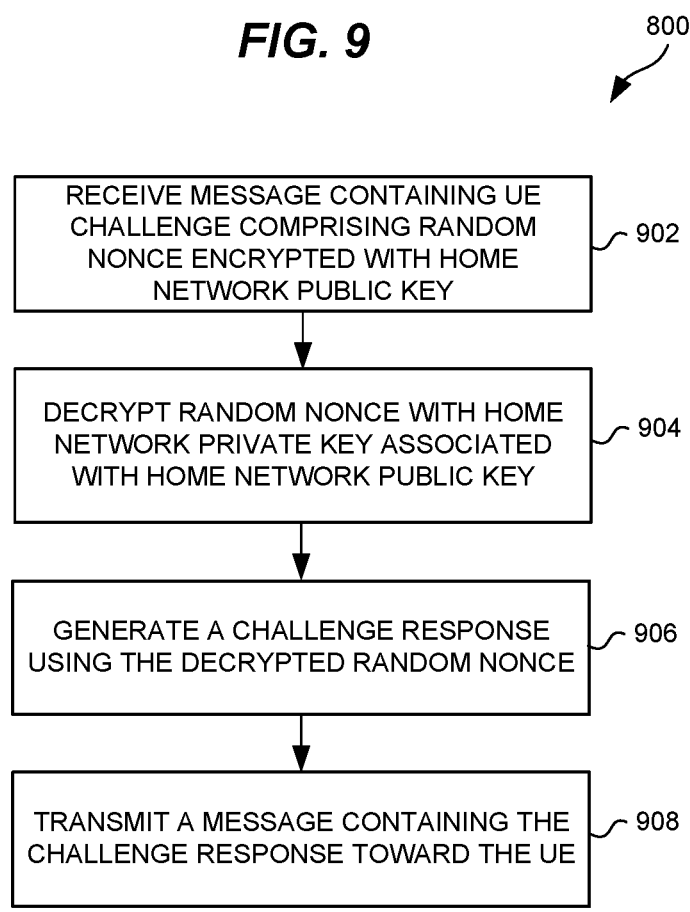

FIGS. 8-9 are flow charts illustrating a method 800 of performing a UE challenge procedure in an illustrative embodiment. The steps of method 800 will be described with reference to UE 106 in FIG. 6 and to network element 700 in FIG. 7, but those skilled in the art will appreciate that method 800 may be performed in other systems, devices, or network functions. The steps of the flow charts described herein are not all inclusive and may include other steps not shown, and the steps may be performed in an alternative order. In this embodiment, it is assumed that UE 106 wants to connect with home network 310, and a security context is not established between UE 106 and home network 310. It may further be assumed that UE 106 has selected a serving network 320 (if needed) to establish communications with home network 310. In order for UE 106 to connect with home network 310, a primary authentication procedure is performed to achieve mutual authentication between UE 106 and home network 310. As described above, the primary authentication procedure includes home network 310 issuing an authentication challenge to UE 106. In this embodiment, UE 106 initiates a UE challenge procedure to the home network 310 before engaging in the primary authentication procedure (step 801).

To initiate the UE challenge procedure, UE 106 (i.e., through authentication controller 634) identifies, selects, or generates a random nonce for the UE challenge procedure, and generates a UE challenge by encrypting the random nonce with the home network public key (step 802). As described above, the SIM 660 of UE 106 is provisioned with the home network public key that is used for concealing the UE ID (e.g., SUPI) corresponding with UE 106, and UE 106 uses the home network public key in generating the UE challenge. UE 106 is configured to encrypt, cipher, or conceal the random nonce with the home network public key. The random nonce is a randomly-selected number of certain or predefined length, such as 128-bits. UE 106 then transmits a message containing the UE challenge toward home network 310 (step 804), such as through via radio unit 620.

In FIG. 9, network element 700 receives the message containing the UE challenge initiated by UE 106 (step 902), such as through network interface component 702. In response to receiving the message, network element 700 (e.g., through authentication controller 704) decrypts, deciphers, or de-conceals the encrypted random nonce with the home network private key associated with the home network public key to reveal the random nonce selected or generated by UE 106 (step 904). Network element 700 generates a challenge response using the decrypted random nonce (step 906), and transmits a message containing the challenge response toward UE 106 (step 908).

In FIG. 8, UE 106 receives a message containing a challenge response (step 806), such as through radio unit 620. It is noted that at this point, UE 106 does not know whether the message is genuine from home network 310 or a malicious message. UE 106 processes the challenge response to determine whether home network 310 decrypted the random nonce in response to the UE challenge (step 808). When the determination in step 808 is that home network 310 decrypted the random nonce in response to UE challenge, UE 106 verifies the identity of home network 310 (step 810). Thus, the UE challenge procedure succeeds and home network 310 is verified to UE 106. UE 106 may then engage in the primary authentication procedure of home network 310 (step 812).

When the determination in step 808 is that home network 310 did not decrypt the random nonce in response to the UE challenge, UE 106 is unable to verify the identity of home network 310 (step 814). Thus, the UE challenge procedure fails and home network 310 is not verified to UE 106. When the UE challenge procedure fails, UE 106 does not engage in the primary authentication procedure with home network 310 (step 816).

One technical benefit of the UE challenge procedure is that UE 106 issues a fresh UE challenge to a network before engaging in primary authentication with the network. The UE challenge ensures that the network has possession of the home network private key before engaging in primary authentication. Thus, the UE receives proof that it is connected to the genuine home network before primary authentication, which makes it less vulnerable to linkage attacks or the like.

Figure 10:
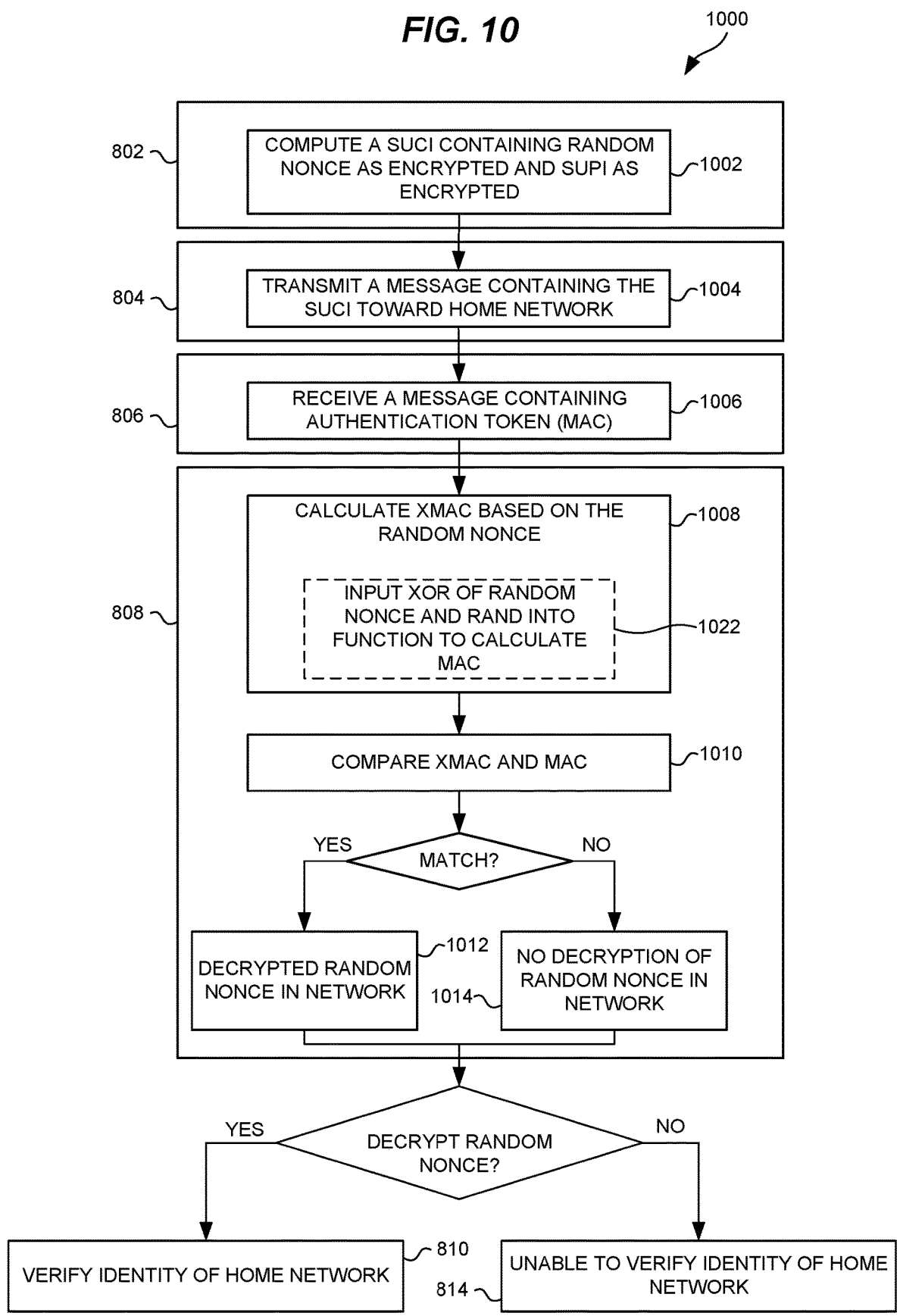
FIGS. 10-11 are flow charts illustrating a method of performing a UE challenge procedure in an illustrative embodiment.
Figure 11:
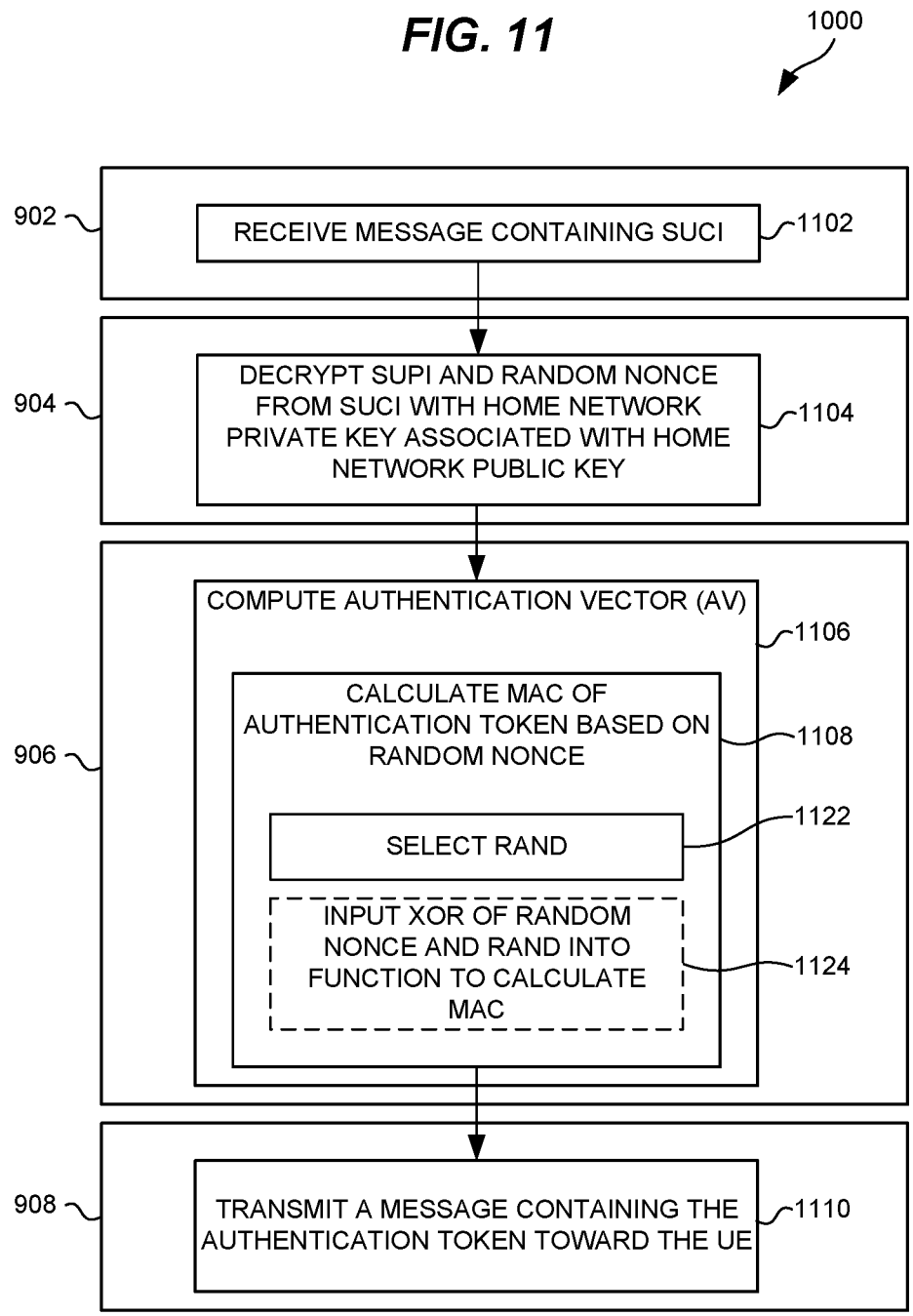

FIGS. 10-14 illustrate one example of a UE challenge procedure. FIGS. 10-11 are flow charts illustrating a method 1000 of performing a UE challenge procedure in an illustrative embodiment. The steps shown in FIGS. 10-11 illustrate further details that may be implemented for method 800. To initiate the UE challenge procedure (step 801 of FIG. 8), UE 106 generates a UE challenge by encrypting a random nonce with the home network public key (step 802). In this embodiment, UE 106 (i.e., through authentication controller 634) identifies the SUPI provisioned on SIM 660, and identifies, selects, or generates a random nonce for the UE challenge procedure. UE 106 then computes a SUCI (e.g., as specified in 3GPP TS 33.501) containing the random nonce as encrypted and the SUPI as encrypted, using the home network public key (step 1002). In one embodiment, UE 106 may concatenate the random nonce as encrypted with the SUPI as encrypted in the SUCI. In other words, UE 106 may join the random nonce to the end of the SUPI, and then conceal the SUPI and the random nonce in the protection scheme output of the SUCI. UE 106 also indicates, by a specific SUPI type or by a specific SUCI scheme indicator, that the SUPI as well as the random nonce is contained in the SUCI.

UE 106 then transmits a message containing the SUCI toward home network 310 (step 1004), such as through radio unit 620. The SUCI containing the encrypted random nonce represents the UE challenge to home network 310. In this embodiment, UE 106 has no security context and wants to register with home network 310. Thus, the message sent by UE 106 is an initial NAS message comprising a registration request.

Figure 12:
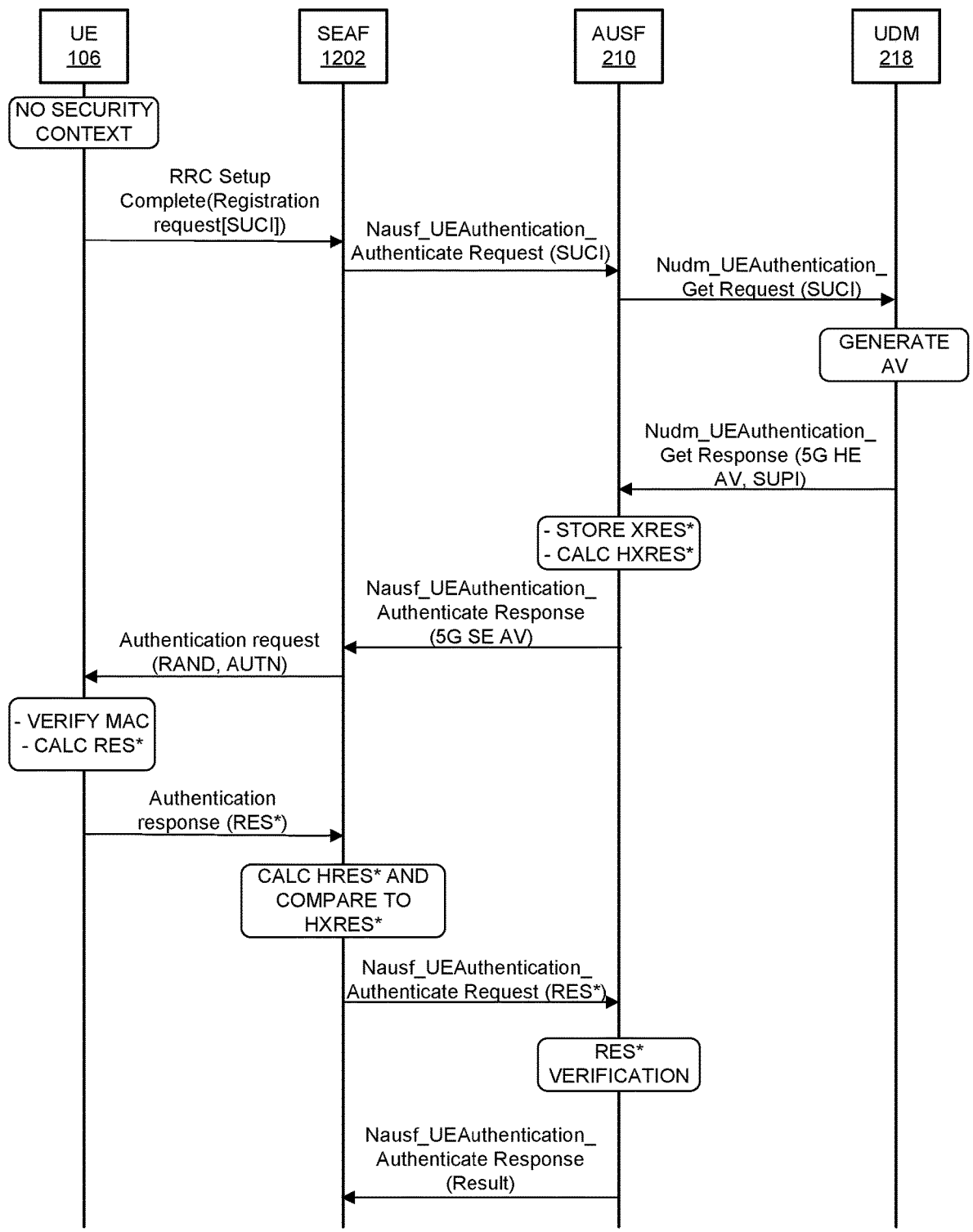
FIG. 12 is a signaling diagram illustrating a UE challenge procedure and a primary authentication procedure in an illustrative embodiment.

FIG. 12 is a signaling diagram illustrating the UE challenge procedure and a primary authentication procedure in an illustrative embodiment. FIG. 12 shows UE 106, a Security Anchor Function (SEAF) 1202, AUSF 210, and UDM 218. SEAF 1202 resides within a serving network 320, such as in an AMF 212, and acts as a middleman during the primary authentication procedure between a UE and a home network. UDM 218 and/or AUSF 210 represent the functions of network element 700 in this embodiment.

As described above, UE 106 computes a SUCI containing the random nonce as encrypted and the SUPI as encrypted, and transmits a message to SEAF 1202. The message contains the SUCI and other subscription credentials. In one embodiment, the message may comprise a registration request from UE 106 that contains the SUCI. The registration request may be carried in a Radio Resource Control (RRC) setup complete message as shown in FIG. 12, which typically carries the initial NAS message.

SEAF 1202 is configured to initiate the primary authentication procedure after receiving any signaling message from the UE AKA protocol and procedures that support entity authentication, message integrity, and message confidentiality, among other security properties. Therefore, in response to the registration request, SEAF 1202 transmits an authentication request (i.e., Nausf_UEAuthentication_Authenticate Request) to AUSF 210 containing the SUCI and other desired information. In response to the authentication request, AUSF 210 verifies that the serving network 320 requesting the authentication service is authorized. Upon success, AUSF 210 transmits an authentication request (i.e., Nudm_UEAuthentication_Get Request) to UDM 218 containing the SUCI and other desired information. It is noted however that SEAF 1202 initiates the primary authentication procedure after receiving the UE challenge from UE 106, so the UE challenge procedure to home network 310 initiated before the primary authentication procedure is initiated.

In FIG. 11, UDM 218 receives the message containing the SUCI (step 1102). UDM 218 hosts functions related to ARPF 740 and SIDF 742. SIDF 742 extracts the SUCI from the message, and decrypts or de-conceals the SUPI and the random nonce from the SUCI using the home network private key associated with the home network public key (step 1104). If the SUPI and random nonce are concatenated in the SUCI, then SIDF 742 may de-concatenate the random nonce and the SUPI. ARPF 740 selects the authentication method configured for the subscriber (e.g., 5G-AKA), and computes or derives an authentication vector (AV) for the primary authentication procedure (step 1106). The authentication vector comprises an authentication token (AUTN), an expected response (XRES*), a key ($K_{AUSF}$), and a random challenge (RAND).

As part of computing the authentication token (AUTN) of the authentication vector, ARPF 740 calculates, derives, or computes a Message Authentication Code (MAC) based on the random nonce (step 1108). The MAC, which is computed based on the random nonce, represents a challenge response to UE 106. ARPF 740 computes the MAC with a message authentication function (f1) using the sequence number (SQN), the random challenge (RAND), and the Authentication Management Field (AMF) as inputs as is described in 3GPP TS 33.102 (v16.0.0), which is incorporated by reference as if fully included herein.

Figure 13:
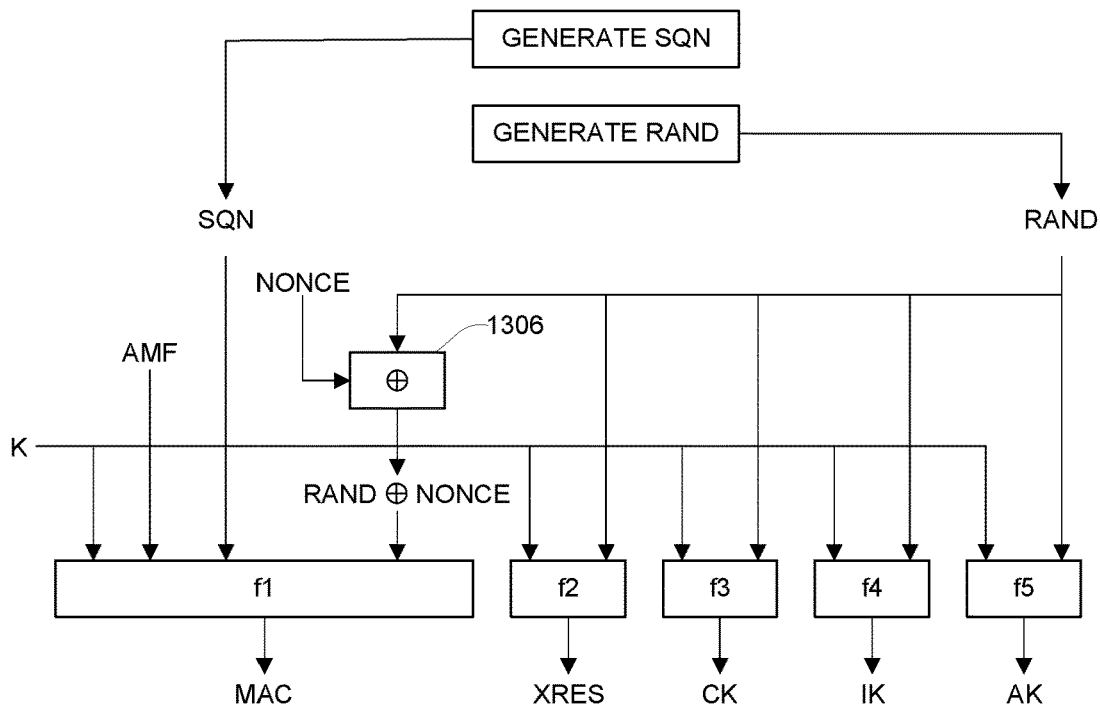
FIG. 13 illustrates generation of an authentication vector (AV) in an illustrative embodiment.

FIG. 13 illustrates generation of an authentication vector (AV) in an illustrative embodiment. For primary authentication, ARPF 740 starts with generating a fresh sequence number (SQN), and generating or selecting an unpredictable network challenge comprising a random number (RAND) (see also, step 1122 of FIG. 11). To generate the home environment (HE) AV, ARPF 740 computes the expected response (XRES) with function f2 (XRES=$f2_K$ (RAND)), where f2 is a (possibly truncated) message authentication function. ARPF 740 computes a cipher key (CK) with function f3 (CK=$f3_K$ (RAND)), where f3 is a key generating function. ARPF 740 computes an integrity key (IK) with function f4 (IK=$f4_K$ (RAND)), where f4 is a key generating function. ARPF 740 computes an anonymity key with function f5 (AK=$f5_K$ (RAND)), where f5 is a key generating function.

In this embodiment, ARPF 740 computes the MAC based on the random nonce provided by UE 106 (see step 1108 of FIG. 11). ARPF 740 computes the MAC with function f1 (also referred to as a MAC function), which uses a long-term secret key (K), the AMF, and the sequence number (SQN) as inputs. ARPF 740 also includes the random nonce generated by UE 106 and the random number (RAND) as input to function f1 in generating the MAC. In one embodiment, ARPF 740 may implement an exclusive-OR (XOR) function 1306 using the random number (RAND) and the random nonce as inputs, and input the result of the exclusive-OR function 1306 into function f1 (along with K, AMF, and SQN) to compute the MAC (see also, optional step 1124 of FIG. 11). The authentication token (AUTN) is defined as AUTN:=SQN⊕AK∥AMF∥MAC. The authentication vector (AV) is defined as AV:=RAND∥XRES*∥CK∥IK∥AUTN.

One technical benefit of using the exclusive-OR function 1306 as discussed above is the function f1 does not need to be changed, and the MAC represents a challenge response that is generated based on the decrypted random nonce. Exclusive-OR function 1306 is one possible function that may be used to include the random nonce as input to the function f1. In another embodiment, the random number (RAND) and the random nonce may be concatenated as input to function f1. In another embodiment, function f1 may be changed to receive the random nonce as input.

In FIG. 11, UDM 218 transmits a message containing the (HE) authentication vector (i.e., containing the authentication token (AUTN) and the random number (RAND)) toward UE 106 (step 1110). In FIG. 12, for example, UDM 218 transmits an authentication response (i.e., Nudm_UEAuthentication_Get Response) to AUSF 210 containing the HE authentication vector, the SUPI, and/or any other desired information. In response to the authentication response, AUSF 210 stores the expected response (XRES*) with the SUPI, and key (KAUSF). AUSF 210 computes a hash expected response (HXRES*) from the expected response (XRES*), and derives a key KSEAF from the stored key KAUSF. AUSF 210 replaces the expected response (XRES*) with the hash expected response (HXRES*), and the key KAUSF with the key KSEAF in the authentication vector (5G Serving Environment (SE) AV). AUSF 210 then transmits an authentication response (i.e., Nausf_UEAuthentication_Authenticate_Response) to SEAF 1202 that includes the authentication vector (5G SE AV). SEAF 1202 stores the expected response token (HXRES*), and sends an authentication request to UE 106 containing the random number (RAND) and the authentication token (AUTN).

In FIG. 10, UE 106 receives a message (e.g., authentication request from SEAF 1202) containing an authentication token (AUTN) and a random challenge (RAND) (step 1006). It is noted that at this point, UE 106 does not know whether the message is genuine from home network 310 or a malicious message. The authentication token includes a MAC (also referred to as a network MAC) calculated or generated by home network 310. UE 106 calculates its own MAC (XMAC) based on the random nonce (step 1008). In other words, UE 106 calculates its own version of the MAC, referred to as the UE MAC or XMAC, based on the random nonce that is previously generated and was provided to home network 310. UE 106 compares the MAC received in the authentication token and the XMAC it generates based on the random nonce (step 1010). When the MAC received in the authentication token matches the XMAC, UE 106 determines that home network 310 decrypted the random nonce in response to the UE challenge (step 1012). When the MAC received in the authentication token does not match the XMAC, UE 106 determines that home network 310 did not decrypt the random nonce in response to the UE challenge (step 1014). After determining whether or not home network 310 is verified to UE 106, UE 106 may choose to engage or not engage in primary authentication as described in method 800.

In FIG. 12, for example, after verifying the MAC received in the authentication token, UE 106 engages in primary authentication by generating, calculating, or computing a response (RES*) or response token. UE 106 transmits an authentication response to SEAF 1202 that includes the response (RES*) derived by UE 106. SEAF 1202 computes a hash response (HRES*) from the response (RES) generated by UE 106, and compares the hash response (HRES*) to the hash expected response (HXRES*). If they match, SEAF 1202 considers the authentication successful from the serving network point of view. SEAF 1202 then transmits another authentication request (i.e., Nausf_UEAuthentication_Authenticate Request) to AUSF 210 containing the response (RES*) generated by UE 106 and/or any other desired information. AUSF 210 compares the response (RES*) generated by UE 106 with the expected response (XRES*). If they match, AUSF 210 considers the authentication successful from the home network point of view. AUSF 210 then sends an authentication response (i.e., Nausf_UEAuthentication_Authenticate Response) to SEAF 1202 indicating success/failure of the authentication. If the authentication was successful, the key $K_{SEAF}$ received in the authentication vector will become the anchor key in the sense of the key hierarchy. The primary authentication procedure as described above may be performed according to 3GPP specifications described in TS 33.501 (v17.2.1), which is incorporated by reference as if fully included herein.

Figure 14:
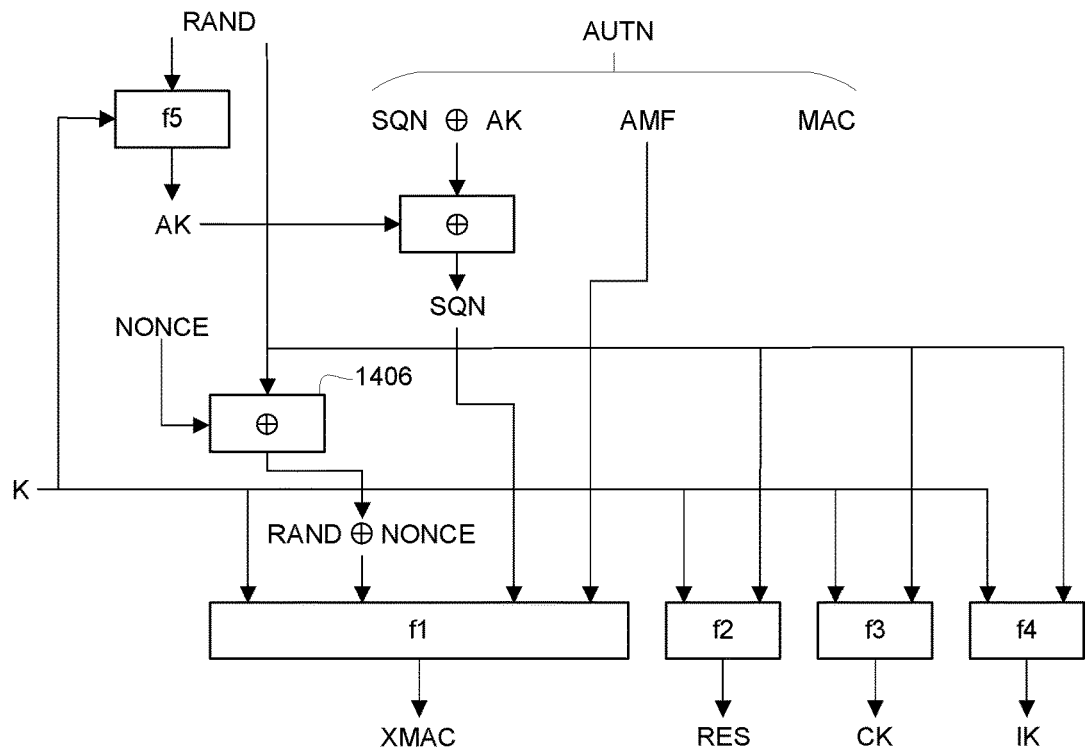
FIG. 14 illustrates generation of a MAC in a UE in an illustrative embodiment.

FIG. 14 illustrates generation of a MAC in a UE in an illustrative embodiment. UE 106 parses the authentication token (AUTN) to extract the exclusive-OR of the sequence number (SQN) and the anonymity key (AK), the AMF, and the MAC generated by home network 310. UE 106 computes the response (RES) with function f2 (RES=f2$_K$ (RAND)), computes a cipher key (CK) with function f3 (CK=f3$_K$ (RAND)), computes an integrity key (IK) with function f4 (IK=f4$_K$ (RAND)), and computes an anonymity key with function f5 (AK=f5$_K$ (RAND)).

In this embodiment, UE 106 computes the XMAC based on the random nonce. UE 106 computes the XMAC with function f1, which also uses a long-term secret key (K), the AMF, and the sequence number (SQN) as inputs. UE 106 also includes the random nonce and the random number (RAND) as input to function f1 in generating the XMAC. In one embodiment, UE 106 may implement an exclusive-OR function 1406 using the random number (RAND) and the random nonce as inputs, and use the result of the exclusive-OR function 1406 as input into the function f1 (along with K, AMF, and SQN) to compute the XMAC (see also, optional step 1022 of FIG. 10). UE 106 may then compare the XMAC with the MAC included in the authentication token (AUTN) (see step 1010 of FIG. 10).

One technical benefit of using the exclusive-OR function 1406 as discussed above is the function f1 does not need to be changed in generating the XMAC. Exclusive-OR function 1406 is one possible function that may be used to include the random nonce as input to the function f1. In another embodiment, the random number (RAND) and the random nonce may be concatenated as input to function f1. In another embodiment, function f1 may be changed to receive the random nonce as input. In any event, the manner of computing the XMAC in UE 106 with the random nonce should match the manner of computing the MAC in the network using the random nonce.

The UE challenge procedure as described above is advantageous in that it can prevent a linkage attack via SUCI replay, because a replayed SUCI does not contain the random nonce that UE 106 has sent in its most recent SUCI. Thus, the check of the MAC in the authentication token always fails at UE 106, and the attacker cannot learn anything from this. This UE challenge procedure also prevents a linkage attack via authentication challenge replay. An FBS cannot send a correctly integrity protected authentication challenge; it can only send a replayed authentication challenge without integrity protection. NAS messages without integrity protection are ignored by UE 106 if a NAS security context already exists. To make UE 106 react on the replayed authentication message, the FBS must act like the network when it has no security context for UE 106. This involves identifying UE 106 via a SUCI, and this SUCI will contain a fresh random nonce. The subsequent replayed authentication challenge will not comprise the proper MAC computed with the fresh random nonce, so the check of the MAC in the authentication token always fails at UE 106, and the attacker cannot learn anything from this.

Further advantages are a single mechanism is used to overcome both linkage attacks. No new messages and no new parameters need to be defined, except for inclusion of the random nonce in the SUCI. The UE challenge procedure requires simple additional calculations (e.g., single additional exclusive-OR operation to calculate/verify the MAC), no additional public key operations are needed, no access to the long-term key is required, and no timestamp is required (thus avoidance of potential timestamp issues like clock mis-synchronization or race conditions where an attacker can exploit small time variations which a timestamp-based mechanism may need to allow for due to lack of full clock synchronization). This solution also allows for backwards compatibility, where a new SUPI type or a new SUCI scheme identifier can indicate that a random nonce is included.

Figure 15:
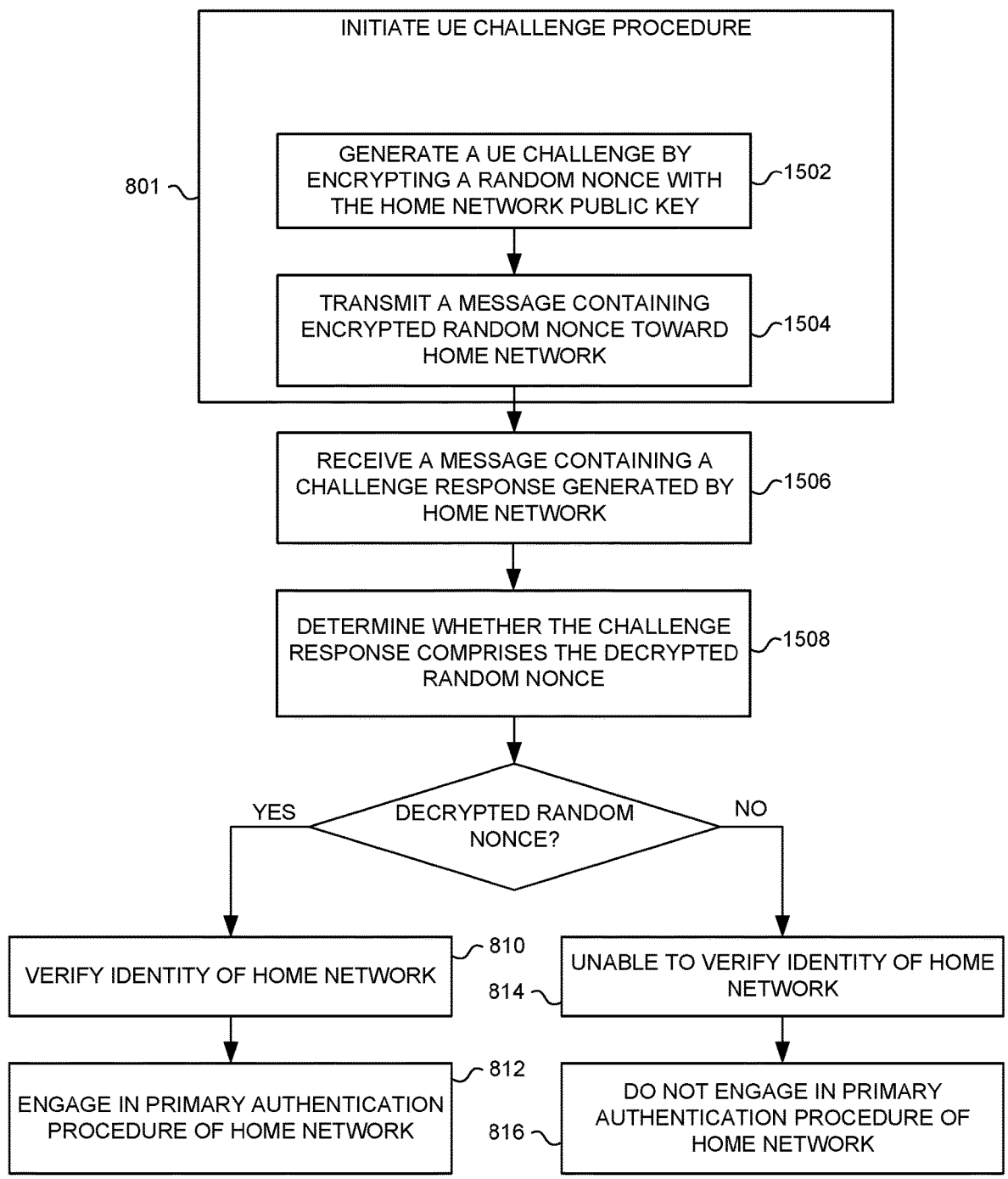
FIGS. 15-16 are flow charts illustrating a method of performing a UE challenge procedure in an illustrative embodiment.
Figure 16:
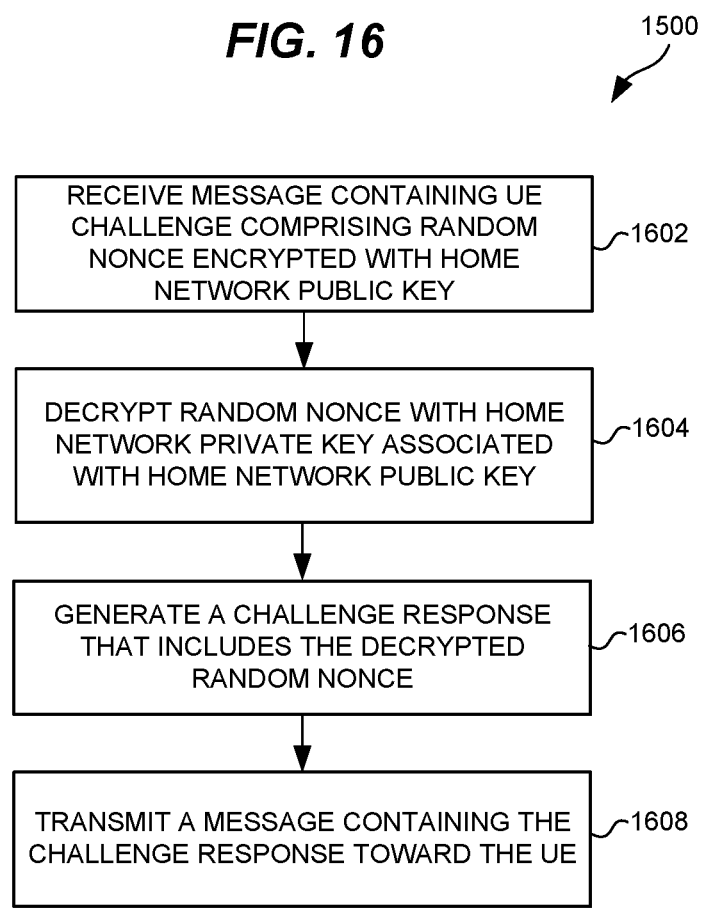
Figure 17:
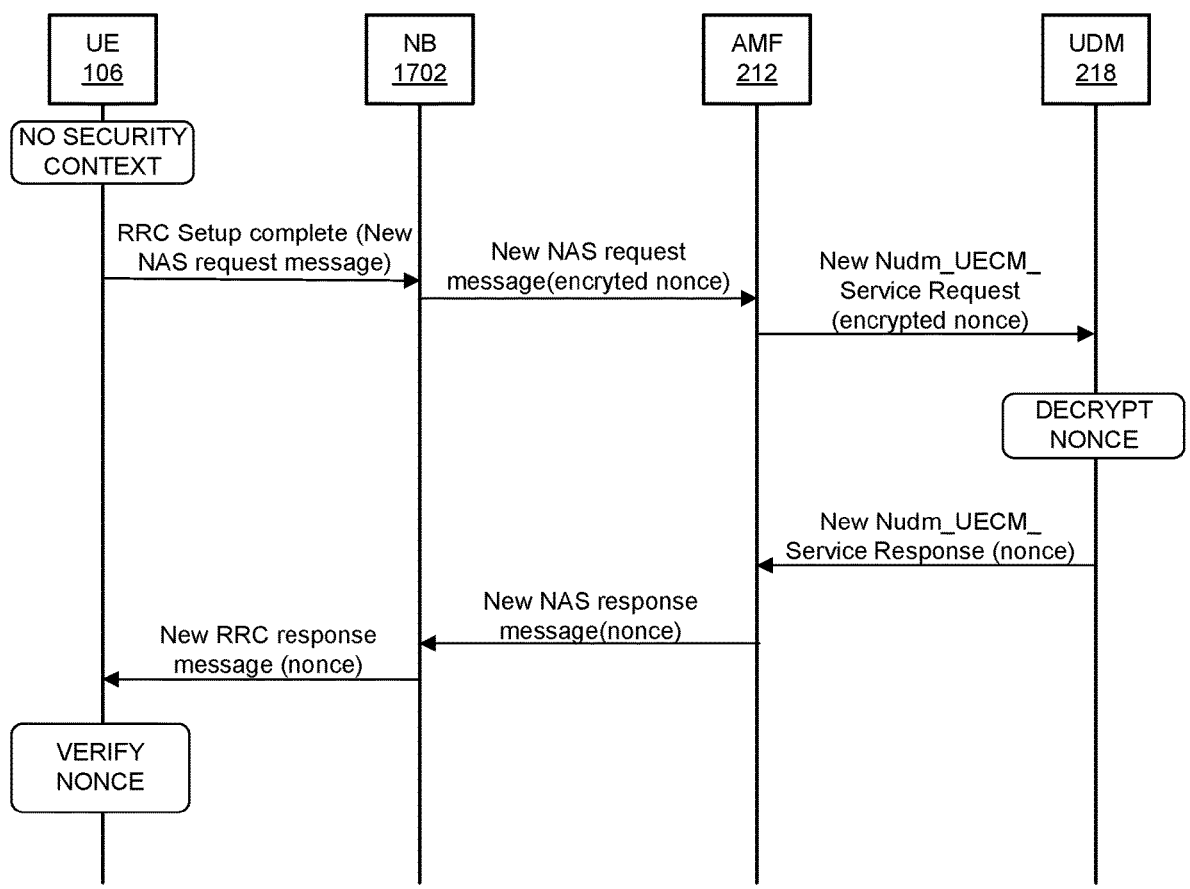
FIG. 17 is a signaling diagram illustrating a UE challenge procedure in an illustrative embodiment.

FIGS. 15-17 illustrate another example of a UE challenge procedure. FIGS. 15-16 are flow charts illustrating a method 1500 of performing a UE challenge procedure in an illustrative embodiment. The steps shown in FIGS. 15-16 illustrate further details that may be implemented for method 800. To initiate the UE challenge procedure (step 801 of FIG. 8), UE 106 generates a UE challenge by encrypting, ciphering, or concealing a random nonce with the home network public key (step 1502). UE 106 then transmits a message containing the encrypted random nonce toward home network 310 (step 1504), such as through radio unit 620.

FIG. 17 is a signaling diagram illustrating the UE challenge procedure in an illustrative embodiment. FIG. 17 shows UE 106, an eNodeB (NB) 1702, an AMF 212, and a UDM 218. As described above, UE 106 encrypts the random nonce with the home network public key, and transmits a message to eNodeB 1702 containing the encrypted random nonce. In this embodiment, the message is an initial NAS message embedded, included, or carried in an RRC setup complete message that is sent to eNodeB 1702 as part of the RRC setup procedure. The message is not a registration request, but is a new NAS message conveying the UE challenge to home network 310. The message also includes the home network ID and the home network public key ID (in plain text). The eNodeB 1702 and AMF 212 use the home network ID to route the message to UDM 218 of the subscriber's home network 310. For example, eNodeB 1702 sends a new NAS request message to AMF 212 containing the encrypted random nonce, the home network ID, and the home network public key ID. AMF 212 then sends a new service request (i.e., Nudm_UECM_ServiceRequest) containing the encrypted random nonce and the home network public key ID.

In FIG. 16, UDM 218 receives the message containing the encrypted random nonce (step 1602). UDM 218 is configured to decrypt, decipher, or de-conceal the random nonce using the home network private key associated with the home network public key (step 1604). UDM 218 generates a challenge response that includes the decrypted random nonce (step 1606), and transmits a message containing the decrypted random nonce toward UE 106 (step 1608). In FIG. 17, for example, UDM 218 transmits a new service response to AMF 212 (i.e., Nudm_UECM_Service Response) containing the decrypted random nonce. AMF 212 in turn transmits a new NAS response message containing the decrypted random nonce to eNodeB 1702. The eNodeB 1702 transmits a new RRC response message containing the decrypted random nonce to UE 106.

In FIG. 15, UE 106 receives the message containing the challenge response from home network 310 (step 1506). UE 106 determines whether the challenge response comprises the decrypted random nonce (step 1508). When the challenge response comprises the decrypted random nonce, UE 106 verifies the identity of home network 310 (step 810). Thus, the UE challenge procedure succeeds and home network 310 is verified to UE 106. UE 106 may then send a registration request, and engage in the primary authentication procedure of home network 310 (step 812). When the challenge response does not comprise the decrypted random nonce, UE 106 is unable to verify the identity of home network 310 (step 814). Thus, the UE challenge procedure fails and home network 310 is not verified to UE 106. In this scenario, UE 106 does not engage in the primary authentication procedure of home network 310 (step 816).

One technical benefit of this procedure is that UE 106 does not reveal any UE ID before it has verified the network's response. This may be useful, such as when the null-scheme is configured for SUCI computation. In this scenario, sending a SUCI immediately reveals the true SUPI of the UE 106. The above procedure ensures that the home network 310 is genuine before sending an un-concealed SUPI to the network.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:
1. A device, comprising:
user equipment configured to communicate with a home network through which a subscriber has a subscription for cellular service, the user equipment comprising:
a subscriber identity module provisioned with a home network public key for the home network;
at least one processor; and
at least one memory storing instructions that, when executed by the at least one processor, cause the user equipment at least to:
when no security context exists between the user equipment and the home network, initiate a user equip- ment challenge procedure to the home network before engaging in a primary authentication procedure by:
  generating a user equipment challenge by encrypting a random nonce with the home network public key; and
  transmitting an initial non-access stratum message containing the user equipment challenge toward the home network;
receive a second message containing a challenge response from the home network to the user equipment challenge;
process the challenge response to determine whether the home network decrypted the random nonce in response to the user equipment challenge;
verify an identity of the home network when the home network decrypted the random nonce in response to the user equipment challenge; and
engage in the primary authentication procedure according to 3rd generation partnership project specifications when the identity of the home network is verified.

2. The device of claim 1, wherein:
the subscriber identity module is provisioned with a subscription permanent identifier; and
the instructions are further configured to, with the at least one processor, cause the user equipment at least to:
compute a subscription concealed identifier for the user equipment that includes the random nonce as encrypted and the subscription permanent identifier as encrypted; and
transmit the initial non-access stratum first message containing the subscription concealed identifier toward the home network.

3. The device of claim 1, wherein:
the second message received by the user equipment contains an authentication token that includes a first message authentication code generated by the home network; and
the instructions are further configured to, with the at least one processor, cause the user equipment at least to:
  calculate a second message authentication code based on the random nonce;
  compare the first message authentication code and the second message authentication code; and
  determine that the home network decrypted the random nonce in response to the user equipment challenge when the first message authentication code and the second message authentication code match.

4. The device of claim 3, wherein:
the second message received by the user equipment contains a random challenge; and
the instructions are further configured to, with the at least one processor, cause the user equipment at least to:
  calculate the second message authentication code by inputting an exclusive-OR of the random challenge and the random nonce into a function that calculates the second message authentication code.

5. The device of claim 1, wherein:
the initial non-access stratum message comprises a registration request.

6. The device of claim 5, wherein the instructions are further configured to, with the at least one processor, cause the user equipment at least to:
transmit the registration request in a radio resource control setup complete message.

7. The device of claim 1, wherein:
the challenge response received in the second message comprises the random nonce as decrypted.

8. A method, comprising:
in user equipment configured to communicate with a home network through which a subscriber has a subscription for cellular service:
when no security context exists between the user equipment and the home network, initiating a user equipment challenge procedure to the home network before engaging in a primary authentication procedure by:
  generating a user equipment challenge by encrypting a random nonce with a home network public key for the home network provisioned on a subscriber identity module of the user equipment; and
  transmitting an initial non-access stratum message containing the user equipment challenge toward the home network;
receiving a second message containing a challenge response from the home network to the user equipment challenge;
processing the challenge response to determine whether the home network decrypted the random nonce in response to the user equipment challenge;
verifying an identity of the home network when the home network decrypted the random nonce in response to the user equipment challenge; and
engaging in the primary authentication procedure according to 3rd generation partnership project specifications when the identity of the home network is verified.

9. The method of claim 8, wherein:
generating the user equipment challenge comprises computing a subscription concealed identifier for the user equipment that includes the random nonce as encrypted and a subscription permanent identifier as encrypted, wherein the subscriber identity module is provisioned with the subscription permanent identifier; and
transmitting the initial non-access stratum message comprises transmitting the initial non-access stratum message containing the subscription concealed identifier toward the home network.

10. The method of claim 8, wherein:
the second message received by the user equipment contains an authentication token that includes a first message authentication code generated by the home network; and
processing the challenge response comprises:
  calculating a second message authentication code based on the random nonce;
  comparing the first message authentication code and the second message authentication code; and
  determining that the home network decrypted the random nonce in response to the user equipment challenge when the first message authentication code and the second message authentication code match.

11. The method of claim 10, wherein:
the second message received by the user equipment contains a random challenge; and
calculating the second message authentication code comprises inputting an exclusive-OR of the random challenge and the random nonce into a function that calculates the second message authentication code.

12. The method of claim 8, wherein:
the initial non-access stratum message comprises a registration request.

13. The method of claim 12, wherein transmitting the initial non-access stratum message comprises:

transmitting the registration request in a radio resource control setup complete message.

14. The method of claim 8, wherein:
the challenge response received in the second message comprises the random nonce as decrypted.

15. A network element comprising:
a unified data management element of a home network for user equipment through which a subscriber has a subscription for cellular service, wherein the unified data management element comprises:
at least one processor; and
at least one memory storing instructions that, when executed by the at least one processor, cause the unified data management element at least to:
when no security context exists between the user equipment and the home network, receive an initial non-access stratum message containing a user equipment challenge initiated by the user equipment prior to a primary authentication procedure performed according to 3rd generation partnership project specifications, wherein the user equipment challenge comprises a random nonce encrypted by the user equipment with a home network public key provisioned on a subscriber identity module of the user equipment;
decrypt the random nonce with a home network private key;
generate a challenge response using the random nonce; and
transmit a second message that contains the challenge response toward the user equipment.

16. The network element of claim 15, wherein the instructions are further configured to, with the at least one processor, cause the unified data management element at least to:
receive the initial non-access stratum message containing a subscription concealed identifier for the user equipment; and
decrypt the random nonce and a subscription permanent identifier from the subscription concealed identifier using the home network private key.

17. The network element of claim 15, wherein the instructions are further configured to, with the at least one processor, cause the unified data management element at least to:
calculate a message authentication code of an authentication token based on the random nonce; and
transmit the second message containing the authentication token toward the user equipment.

18. The network element of claim 17, wherein the instructions are further configured to, with the at least one processor, cause the unified data management element at least to:
select a random number;
calculate the message authentication code by inputting an exclusive-OR of the random number and the random nonce into a function that calculates the message authentication code; and
transmit the second message containing the authentication token and the random number toward the user equipment.

19. The network element of claim 15, wherein:
the initial non-access stratum message comprises a registration request.

20. The network element of claim 19, wherein:
the registration request is carried in a radio resource control setup complete message.

* * * * *